United States Patent
Blackburn et al.

(10) Patent No.: US 11,165,643 B1
(45) Date of Patent: *Nov. 2, 2021

(54) CLOUD COMPLIANCE DRIFT AUTOMATION AND ROOT CAUSE ANALYSIS TOOL

(71) Applicant: Wells Fargo Bank, N.A., San Francisco, CA (US)

(72) Inventors: Justin Christopher Blackburn, Litchfield Park, AZ (US); Jacob Blackburn, San Francisco, CA (US); Lorie Royal, San Francisco, CA (US); Shawn Kelly, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,922

(22) Filed: Nov. 30, 2020

Related U.S. Application Data (63) Continuation of application No. 16/257,825, filed on Jan. 25, 2019, now Pat. No. 10,855,536.

(51) Int. Cl.
*H04L 12/24* (2006.01)
*H04L 29/08* (2006.01)

(52) U.S. Cl.
CPC ...... *H04L 41/0816* (2013.01); *H04L 41/0631* (2013.01); *H04L 41/0672* (2013.01); *H04L 41/0853* (2013.01); *H04L 41/0886* (2013.01); *H04L 41/0893* (2013.01); *H04L 41/16* (2013.01); *H04L 67/34* (2013.01); *H04L 67/10* (2013.01)

(58) Field of Classification Search
CPC ............ H04L 41/0816; H04L 41/0631; H04L 41/0853; H04L 41/0886; H04L 41/0893; H04L 41/16; H04L 67/34
See application file for complete search history.

(56) References Cited

U.S. PATENT DOCUMENTS

| | | | | |
|---|---|---|---|---|
| 7,023,581 | B2 * | 4/2006 | Soler | H04N 1/4078 358/1.9 |
| 8,762,508 | B2 * | 6/2014 | Shah | G06F 9/44505 709/223 |
| 9,378,461 | B1 * | 6/2016 | Chatterjee | G06F 9/5005 |

(Continued)

*Primary Examiner* — Sargon N Nano
(74) *Attorney, Agent, or Firm* — Kilpatrick Townsend & Stockton LLP (57) ABSTRACT

Automatic detection and remediation of a noncompliant configuration of an information handling system is disclosed. A determination is made whether a triggering event has occurred that has a potential for degrading compliance of the information handling system. In response to determining that the triggering event has occurred, a configuration scan of the hardware and software of the information handling system is performed to obtain current configuration information. The current configuration information is compared to baseline configuration information that was obtained in response to a previous triggering event. Subsequently, a determination is made as to whether any changes determined in the current configuration information are non-compliant based on a comparison to compliance status information. One or more compliance remediation operations are invoked in response to determining that at least one change is non-compliant.

15 Claims, 5 Drawing Sheets

(56) References Cited

U.S. PATENT DOCUMENTS

| | | | |
|---|---|---|---|
| 9,577,883 B2* | 2/2017 | Ding | H04L 41/082 |
| 9,697,238 B2* | 7/2017 | Ahmed | G06F 16/252 |
| 10,038,702 B2* | 7/2018 | Thomas | H04L 63/20 |
| 10,375,115 B2* | 8/2019 | Mallya | G06F 21/57 |
| 2013/0125204 A1* | 5/2013 | La Fever | G06F 12/1408 |
| | | | 726/2 |
| 2016/0080422 A1 | 3/2016 | Belgodere et al. | |
| 2017/0026240 A1* | 1/2017 | Purusothaman | H04L 41/0233 |
| 2017/0214576 A1* | 7/2017 | Pan | H04L 41/0843 |
| 2017/0255874 A1 | 9/2017 | Chafle et al. | |
| 2017/0300370 A1 | 10/2017 | Chafle et al. | |
| 2017/0351991 A1 | 12/2017 | Halberstadt et al. | |
| 2018/0314439 A1* | 11/2018 | Graham | H04L 41/046 |
| 2020/0073656 A1* | 3/2020 | Satapathy | G06F 11/0766 |

* cited by examiner

CLOUD COMPLIANCE DRIFT AUTOMATION AND ROOT CAUSE ANALYSIS TOOL

This application is a continuation of U.S. patent application Ser. No. 16/257,825, filed Jan. 25, 2019, and entitled "CLOUD COMPLIANCE DRIFT AUTOMATION AND ROOT CAUSE ANALYSIS TOOL," the entirety of which is incorporated herein by reference.

BACKGROUND

The present application relates to systems and methods for automatically detecting configuration non-compliance of an information handling system (IHS), and more particular to systems and methods for automatically detecting non-compliance in a cloud hosting IHS.

Enterprise IHSs include a large number of servers and storage appliances that require frequent hardware and software configuration changes. Changes can include deploying code and containers via an automated deployment system. Timing and tracking of the deployment may be under the control of a change management system. Configuration changes also arise due to having particular servers and storage appliances made available or unavailable due to maintenance or upgrade actions. In order to function correctly, software developers may put together one or more changes to add functionality, reduce security vulnerabilities, or to correct errors. In large enterprise IHSs, a distributed architecture such as a cloud hosting IHS can include many nodes that perform a portion of a computing or storage workload. Files are split into large blocks and distributed across nodes in a cluster of the enterprise IHS. Packaged code is transferred into the nodes to process data of the blocks in parallel, taking advantage of data locality. Particular nodes manipulate a subset of the data that is accessible to the particular node. Configuration changes such as software patches, version upgrades for compliance, etc., that are deployed may be identical for some or all of the nodes.

Increasingly, vulnerabilities in enterprise IHSs are discovered and exploited by malicious parties. Considerable effort is made in removing such vulnerabilities when discovered. Security administrators of an enterprise IHS maintain a compliance status database containing information about what configurations are compliant, and conversely, what configurations then are non-compliant. Automated compliance scan tools are generally relied upon to periodically identify components of the enterprise IHS that are non-compliant. To reduce infrastructure requirements for performing a compliance scan, such scans are generally scheduled on a calendar basis. Non-compliance on particular servers or storage appliances can persist for a period of time until the non-compliance is discovered. Often another period of time is required for a manual process to be initiated to perform a root cause analysis (RCA) of how the non-compliance occurred and to schedule a corrective action. During this period, the non-compliant portion of the enterprise IHS can pose a vulnerability to the overall enterprise IHS.

Many of the currently available tools for DEVOPS come with the ability to define compliance settings. When a non-compliant condition is detected by the DEVOPS system such as PUPPET, CHEF, ANSIBLE, SALT, etc., the tool will periodically recognize the condition and simply change the setting to a compliant state. For instance, if a port is open or a file permission is incorrectly set, the automation software simply cures the condition by reverting the permission or closing the port. There is the possibility that the triggering event, the non-compliant time period, the automated remediation, and the calendar-based scan will occur in a time sequence where the non-compliance may never be detected by the scanning tool. Situations such as these may make a much more significant issue appear less severe because the automated remediation is actually preventing the problem from being noticed (false negative), and therefore the automation prevents having an investigation initiated into the root cause.

Consider an instance in which a particular software development system is prone to initiating the inclusion of a non-compliant change in a container or code. The non-compliant change can be deployed by an automated deployment system. With each change that the particular software development system prepares, the non-compliant change can reappear. In a cloud hosted IHS with a cluster of nodes assigned to particular workloads, the same non-compliant change can be replicated many times across the enterprise IHS. As the size and complexity of enterprise IHSs increase, the scope of identifying and correcting non-compliant changes in the enterprise IHS become more daunting. Similarly, the length of time and reoccurrences of non-compliance can pose a significant security risk. When accounting for a sufficiently large and complex environment, each piece of data about a non-compliant situation is important and the lack of detail about compliance issues (false negatives) on certain containers, applications, or servers due to the time based rather than event based scan intervals can cause engineers to rule out potentially larger scale problems that involve widespread automation and focus on the wrong root cause.

The ability to gather a larger data set, store massive amounts of data, parse the data, and use AI to draw new conclusions allows the logical leap from Root Cause Analysis in a traditional fixed infrastructure environment to a much more complex, moving, and automated Cloud based environment. The core of this innovation is gathering additional data, more timely data, linking successively larger groups of data together, and performing more complex pattern recognition on data sets that are too large for traditional Root Cause Analysis and therefore require tools such as HADOOP and AI.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

In one or more embodiments, the subject disclosure provides a method for detecting and mitigating a noncompliant configuration of an information handling system (IHS). In one or more embodiments, the method includes detecting occurrence of a triggering event that has potential for degrading compliance of an enterprise information handling system, performing a configuration scan of at least one of hardware or software of the enterprise information handling system to obtain current configuration information, determining one or more changes in the current configuration information based on a comparison of the current configuration information with baseline configuration information obtained in response to a previous triggering event, determining whether at least one change of the one or more changes in the current configuration information is non-compliant based on a comparison to compliance status information, and invoking one or more compliance remediation operations in response to determining that the least one change is non-compliant.

In one or more embodiments, the subject disclosure provides a system that avoids noncompliant configuration changes. In one or more embodiments, the system includes a processor coupled to a memory that stores instructions that, when executed by the processor cause the processor to detect occurrence of a triggering event that has potential for degrading compliance of an enterprise information handling system, perform a configuration scan of at least one of hardware or software of the enterprise information handling system to obtain current configuration information, determine one or more changes in the current configuration information based on a comparison of the current configuration information with baseline configuration information obtained in response to a previous triggering event, determine whether any of the one or more changes identified in the current configuration information are non-compliant based on a comparison to compliance status information, and invoke one or more compliance remediation operations in response to determining that at least one change is non-compliant.

In one or more embodiments, the subject disclosure provides a computer-readable storage medium comprising computer-executable instructions, which when executed by a processing unit on a computer performs acts. The acts include detecting occurrence of a triggering event that has potential for degrading compliance of an enterprise information handling system, wherein the triggering event corresponds to a change to a node of the information handling system, performing a configuration scan of at least one of hardware or software of the enterprise information handling system to obtain current configuration information in near real time in response to the triggering event, determining one or more changes in the current configuration information based on a comparison of the current configuration information with baseline configuration information obtained in response to a previous triggering event, determining that at least one of the one or more changes in the current configuration information is non-compliant based on a comparison to compliance status information, and invoking one or more compliance remediation operations in response to determining that the at least one change is non-compliant.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

A method, enterprise information handling system (IHS), and a computer-readable storage medium provide for mitigating a noncompliant configuration of an IHS. A determination is made whether a triggering event has occurred that has a potential for degrading compliance of the enterprise IHS. In response to determining that the triggering event has occurred, a controller performs a configuration scan of the hardware and software of the enterprise IHS to obtain current configuration information. The controller determines changes in the current configuration information based on a comparison of the current configuration information with baseline configuration information that was obtained in response to a previous triggering event. A determination is made whether any changes determined in the current configuration information are non-compliant based on a comparison to compliance status information. The controller enables the enterprise IHS to perform a compliance remediation operation in response to determining that at least one change is non-compliant.

Cloud compliance drift automation includes features of a pre-event compliance scan together with a post-event compliance scan based on a triggering event. The produced baseline allows expedited and automated root cause analysis to correct noncompliance. The innovation assists enterprises to be more agile in responding to mounting threats of application security or dynamic intrusion management.

In an aspect, the innovation is directed to an automated pre-event and post-event check of compliance status of a machine. The checks are designed to prevent drift from occurring during automation, and to immediately analyze compliance after any triggering event. The checks compare compliance status to known baselines to determine and correlate drift to determine root causes by comparing events to other known events.

One aspect of the present innovation lies in the ability to analyze large amounts of data about possibly millions of events and to do complex correlations. The analysis can use a large amount of computing power, neural networking, and/or distributed processing to find the complex correlations in large amounts of data. The analysis recognizes patterns to find the actual root causes of compliance drift based on triggering events. The compliance checks are performed after triggering events in close to real time so that the compliance changes are as closely tied to the triggering event as possible so that the data analysis can draw logical conclusions about the root causes.

Consider use of tool such as PUPPET (puppet.com, Portland, Oreg.), which is an open-source software configuration management tool that runs on many Unix-like systems as well as on Microsoft Windows. PUPPET includes its own declarative language to describe system configuration. As an enterprise IHSs make a massive shift to cloud-based container-based middleware (2018 technology), periodic and routine use of PUPPET or another product to find non-compliance becomes less and less sufficient on its own. Detection of the non-compliance is too delayed and the process of finding a cause and correction is also labor intensive and slow.

The present innovation provides compliance scanning that occurs every single time that a container gets pushed to a system or a change to a system gets made. These changes are deemed a triggering event. A compliance scan gets run against the system automatically, completely, and in real-time. The entire system is rechecked in a totally automated manner. In one or more embodiments, the compliance check can be driven by: (i) an auto detection of a change by a configuration scan that is triggered in near real time; (ii) detection of a change beginning in PAC2000/DMAN, etc.; and (iii) deployment of a container or code in UDEPLOY, PUPPET, DOCKER, etc.

According to the present disclosure, the compliance scans create accurate historical data. Automated pre-event and post-event checks of the compliance status of the machine can be determined with the accurate historical data. Thereby, automated procedure can ensure that the machine does not drift from more compliant to less compliant without automatically triggering a new root cause analysis (RCA) process to expeditiously rectify the non-compliance. The automation can look at a deployed container itself so that automated deployment can be promptly fixed to prevent additional non-compliant deployments.

Every triggering event prompts a pre-check and a post check that are compared to provide information to an immediate RCA process. Thereby, compliance of every container that is ever deployed can be kept at the same level. The prompt compliance scans enable a seamless RCA process. Granular RCA processes for particular triggering events are aggregated comprehensive RCAs. For example, once a compliance problem is detected on one container, the same fix is promulgated to other identical containers whose deployment is identified through correlation by the comprehensive RCA. The automated deployment system can be fixed once to prevent reoccurrence. According to the present disclosure, compliance scanning, RCA, change management, and deployment all work together. Compliance drift is prevented from occurring during automation. Immediate analysis of a change occurs after any triggering event. The change in configuration is compared to compliance status of a known baseline. Compliance drift is determined. Compliance drift is correlated to determine a root cause by comparing events to other known events.

In one aspect, the present innovation contemplates an ability to analyze large amounts of data about possibly millions of events and to do complex correlations. This requires massive computing power, possibly neural networking, and technologies like distributed processing such as HADOOP to find complex correlations in massive amounts of data. Correlations can include pattern recognition to find the actual root causes of compliance drift based on triggering events. The ability to immediately do compliance checks after triggering events in close to real time enables closely associating compliance changes with the triggering event that created the compliance drift. With this close association, RCA can draw logical conclusions about the cause. In large enterprise information handling systems, the present innovation can incorporate complex data collection from possibly hundreds of sources using technologies like ELASTASEARCH, LOGSTASH, KATANA (ELK STACK) or SPLUNK or HADOOP, etc., and the use of python scripts to do the correlation of configuration and compliance issues.

In one or more embodiments, the present innovation solves a specific type of compliance drift that is not currently being solved such as middleware compliance drift within the configuration space. In addition, the present innovation can be applied to much larger compliance drift challenges that are far more data intensive and that require a deeper level of correlation. Going beyond server deployment and container design, the present disclosure also addresses configuration drift in middleware product configuration rather than software deployment, server deployment or server configuration.

The solution is so data intensive and processing intensive that distributed data analysis is the only way to solve this. The specific technologies used (i.e. PUPPET versus CHEF versus ANSIBLE, etc.) or the number crunching is immaterial. What matters is the present innovative approach to solving a problem that has not been previously contemplated. In the future, performing RCA on ever larger enterprise IHSs is a massive problem. The present disclosure contemplates running massive cloud web hosting environments whose drift and compliance issues are of a magnitude that requires and benefits from this level of automation. The automation can scale with increased complexities. In addition, the present disclosure can be applied across industries and has applications far beyond middleware. The present innovation is applicable to security, compliance, and middleware, but this could apply to any cloud computing environment. This is not necessarily software development related and could be used in a distributed environment as well. It has specific applicability in cloud environments though and possibly in whatever comes next after cloud computing.

Embodiments or examples illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Figure 1:
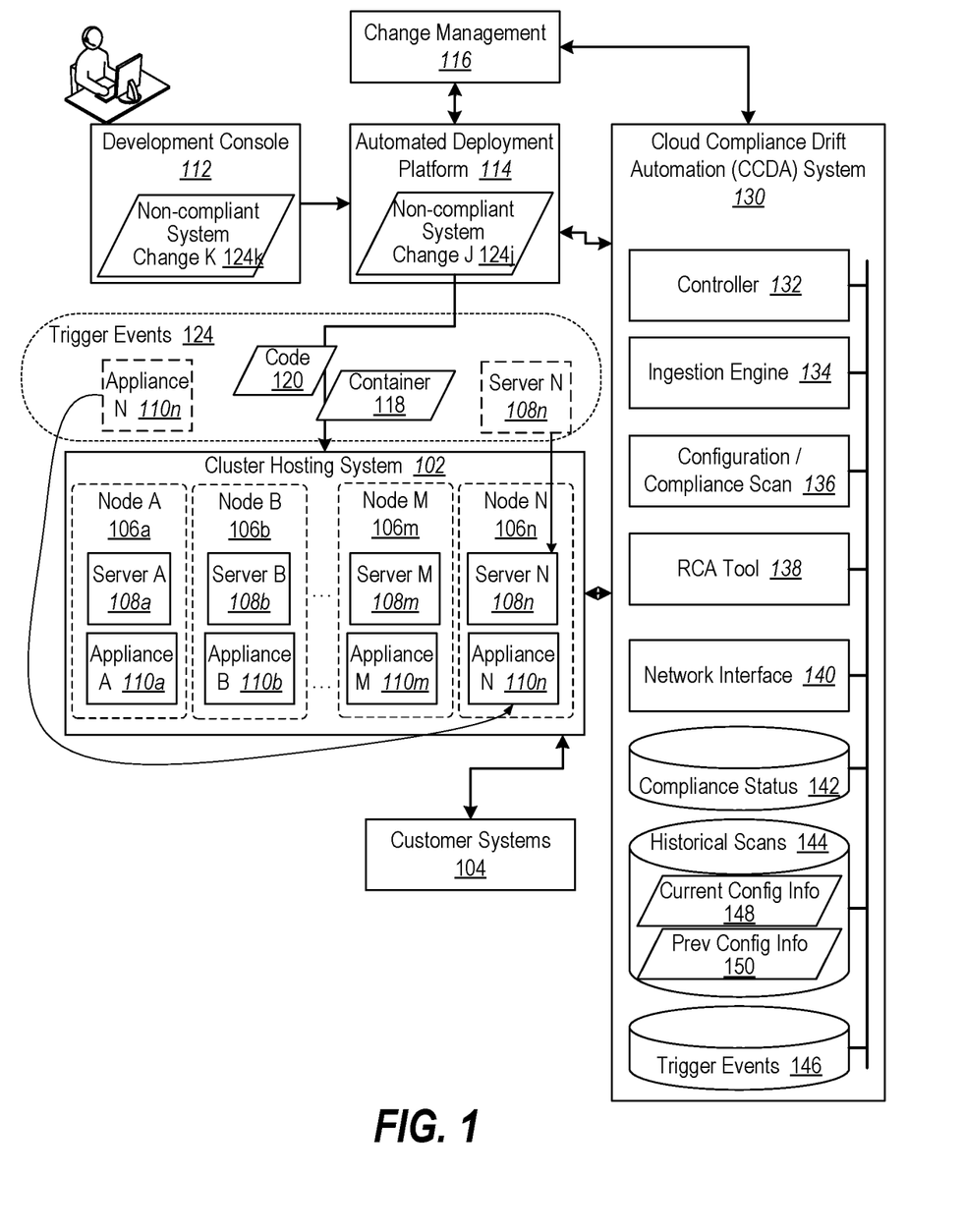
FIG. 1 is a simplified functional block diagram illustrating an enterprise information handling system (IHS) that includes cloud compliance drift automation and a root cause analysis tool, according to one or more embodiments.

Turning to the Drawings, FIG. 1 is a simplified functional block diagram illustrating an enterprise IHS 100 that incorporates cloud compliance drift automation that is triggered by changes so that non-compliant changes are quickly identified. Enterprise IHS 100 also include root cause analysis (RCA) so that a cause of the non-compliance is found and rectified to avoid reoccurrences. Cluster hosting system 102 of enterprise IHS 100 provides distributed processing of computing workload and data storage for customer systems 104. Cluster hosting system 102 distributes file as large blocks to nodes A-N 106a-n that respectively utilize servers A-N 108a-n and storage appliances A-N 110a-n. Nodes A-N 106a-n process data of the large blocks in parallel, taking advantage of data locality wherein a particular node 106a-n manipulates a subset of the data that is accessible to the particular node 106a-n, such as via respective locally-controlled storage appliances 110a-n.

Enterprise IHS 100 provides configuration support for cluster hosting system 102 with one or more development consoles 112 that prepare packaged code that is deployed by an automated deployment platform 114 to nodes A-N 106a-n. Change management system 116 controls the timing of the deployments.

Configuration changes can include deployment of container 118 and code 120, and assignment changes of servers (e.g., server N 108n) and storage appliances (e.g., appliance N 110n). These configuration changes are deemed herein trigger events 122. In some instances, a non-compliant change arises at development console 112. For example, a non-compliant system change "J" 124j is prepared by development console 112 and transferred to automated deployment system 114 for deployment. Even if detected and manually corrected after deployment to cluster hosting system 102, development console 112 can continue creating non-compliant changes, such as non-compliant system change "K" 124k.

Cloud compliance drift automation (CCDA) system 130 is communicatively coupled to cluster hosting system 102, which includes nodes A-N 106a-n, and to change management system 116. CCDA system 130 includes controller 132, ingestion engine 134, configuration/compliance scan engine 136, root cause analysis (RCA) tool 138, network interface 140, compliance status database 142, historical scan database 144, and trigger event database 146. Controller 132 of CCDA system 130 enables enterprise IHS 100 to quickly respond to trigger events 124, invoking other capabilities of CCDA system 130. Ingestion engine 134 processes many sources of information regarding change events that are made to cluster hosting system 102. Configuration/compliance scan engine 136 identifies particular configuration changes that occurred during a most recent change. RCA tool 138 can correlate a non-compliant change to an originating event and entity that created the compliance drift. Network interface 140 provides communication coupling to other portions of enterprise IHS 100. Compliance status database 142 is maintained to reflect what hardware and software configurations are deemed compliant with current performance and security standards. Historical scans database 144 preserves results of previous scans by configuration/compliance scan engine 136. Trigger event database 146 is updated and maintained to capture knowledge gained as to types of changes that should be monitored that are associated with possible compliance drift.

In one or more embodiments, controller 132 enables enterprise IHS 100 to determine whether triggering event 124 has occurred that has a potential for degrading compliance of enterprise IHS 100. In response to determining that triggering event 124 has occurred, controller 132 causes configuration/compliance scan engine 136 to perform a configuration scan of the hardware and software of the enterprise IHS 100 to obtain current configuration information 148.

Configuration/compliance scan engine 136 determines changes in current configuration information 148 based on a comparison of current configuration information 148 with baseline configuration information 150 that was obtained in response to a previous triggering event. Baseline configuration information 150 is the most recent previous scan by configuration/compliance scan engine 136. Controller 132 determines whether any changes determined in current configuration information 148 are non-compliant based on a comparison to compliance status information in compliance status database 142. Controller 132 invokes use of RCA tool 138 to perform a compliance remediation operation in response to determining that at least one change is non-compliant.

Figure 2:
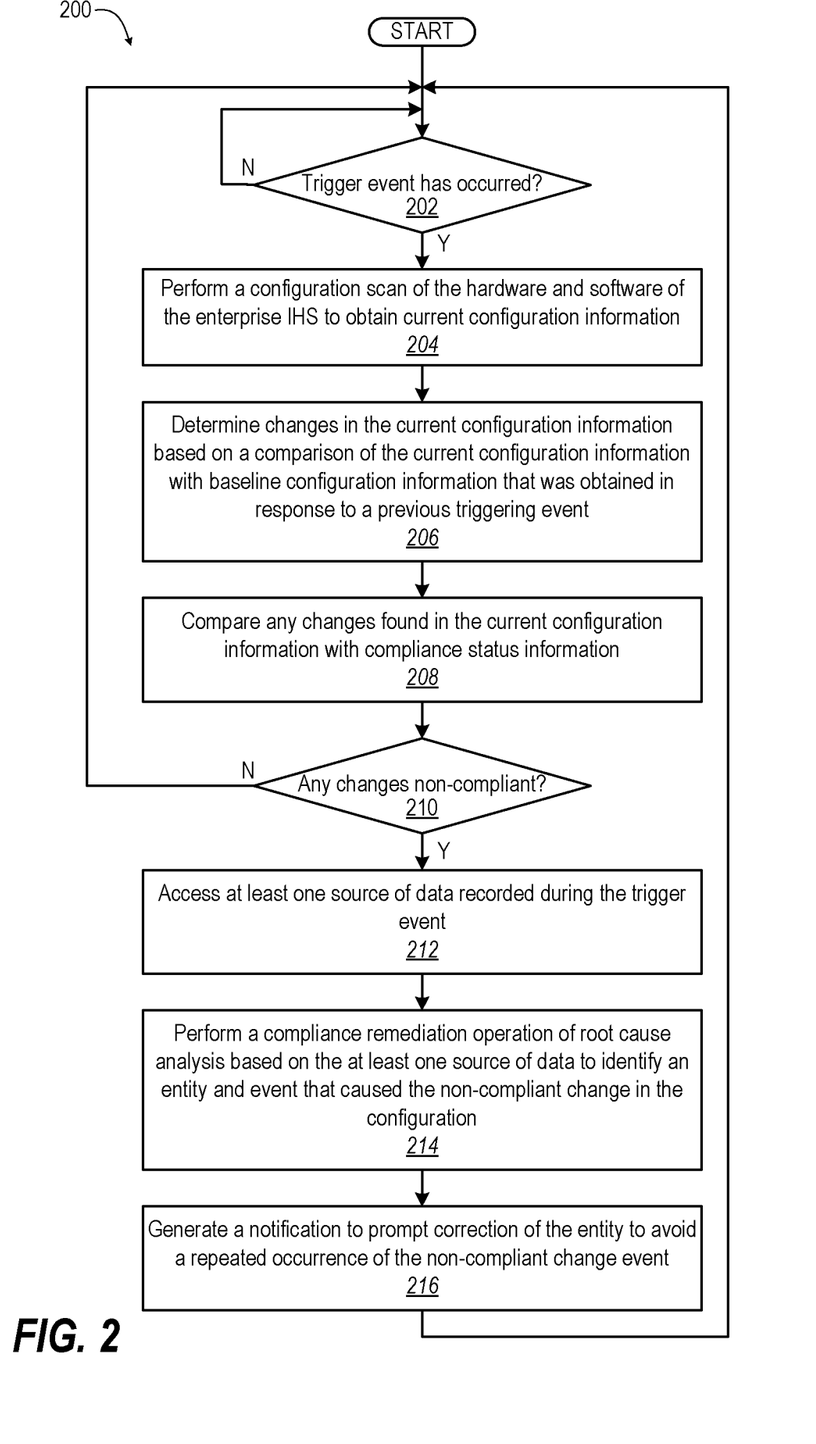
FIG. 2 is a flow diagram illustrating a method for mitigating a noncompliant configuration of the IHS, according to one or more embodiments.

FIG. 2 is a flow diagram illustrating a method 200 for mitigating a noncompliant configuration of an information handling system (IHS). In one or more embodiments, method 200 includes determining, by a controller, whether a triggering event has occurred that has a potential for degrading compliance of an enterprise IHS (decision block 202). In response to determining that the triggering event has not occurred, method 200 returns to decision block 202. In response to determining that the triggering event has not occurred, method 200 includes performing a configuration scan of the hardware and software of the enterprise IHS to obtain current configuration information (block 204). Method 200 includes determining changes in the current configuration information based on a comparison of the current configuration information with baseline configuration information that was obtained in response to a previous triggering event (block 206). Method 200 includes comparing any changes found in the current configuration information with compliance status information (block 208). A determination is made whether any of the changes are non-compliant based on the comparison to the compliance status information (decision block 210). In response to determining no non-compliant changes, method 200 returns to block 202. In response to determining at least one non-compliant change, method 200 includes accessing at least one source of data recorded during the trigger event (block 212). Method 200 includes performing a compliance remediation operation of root cause analysis based on the at least one source of data to identify an entity and event that caused the non-compliant change in the configuration (block 214). Method 200 includes generating a notification to prompt correction of the entity to avoid a repeated occurrence of the non-compliant change (block 216). Then method 200 returns to block 202.

In one or more embodiments, root cause analysis includes performing one or more of: (i) cross correlation analysis; (ii) pattern matching; and (iii) trained neural network analysis to identify the entity and the event that caused the non-compliant change in the configuration. In one or more embodiments, method 200 includes determining whether the change to the configuration comprises deploying more than one identical change to respective portions of the enterprise IHS.

Figure 3:
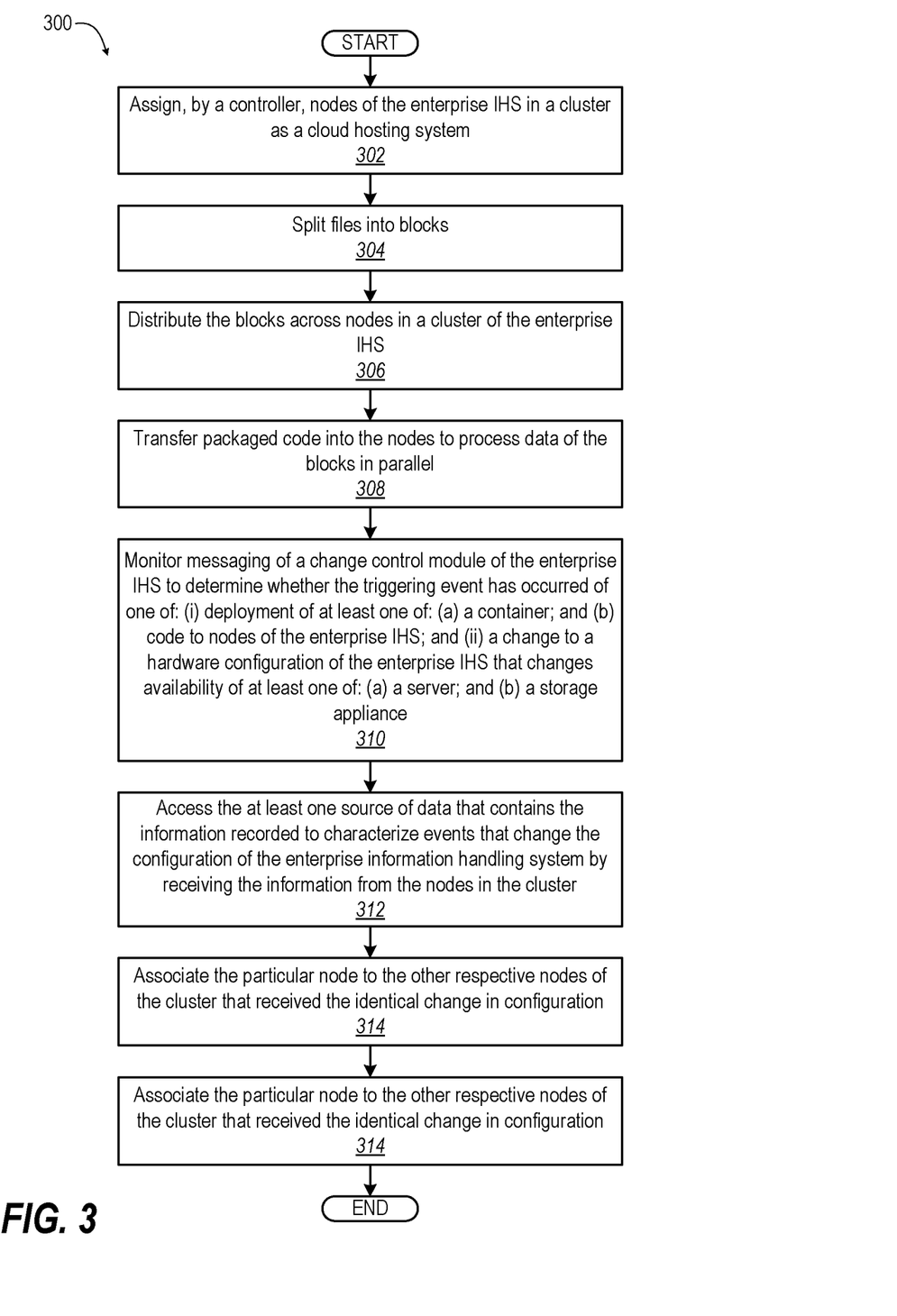
FIG. 3 is a flow diagram illustrating a method for performing compliance scans and root cause analysis in a large, distributed environment, according to one or more embodiments.

FIG. 3 is a flow diagram of a method 300 for performing compliance scans and root cause analysis in a large, distributed environment. In one or more embodiments, method 300 includes assigning, by a controller, nodes of the enterprise IHS in a cluster as a cloud hosting system (block 302). Method 300 includes splitting files into blocks (block 304). Method 300 includes distributing the blocks across nodes in a cluster of the enterprise IHS (block 306). Method 300 includes transferring packaged code into the nodes to process data of the blocks in parallel (block 308). The cluster arrangement takes advantage of data locality wherein a particular node manipulates a subset of the data that is accessible to the particular node.

Method 300 includes monitoring messaging of a change control module of the enterprise IHS to determine whether the triggering event has occurred of one of: (i) deployment of at least one of: (a) a container; and (b) code to nodes of the enterprise IHS; and (ii) a change to a hardware configuration of the enterprise IHS that changes availability of at least one of: (a) a server; and (b) a storage appliance (block 310). Method 300 includes accessing the at least one source of data that contains the information recorded to characterize events that change the configuration of the enterprise information handling system by receiving the information from the nodes in the cluster (block 312). Method 300 includes associating the particular node to the other respective nodes of the cluster that received the identical container (block 314). Method 300 includes identifying an identical corrective action for each of the respective nodes (block 316). Then method 300 ends.

Figure 4:
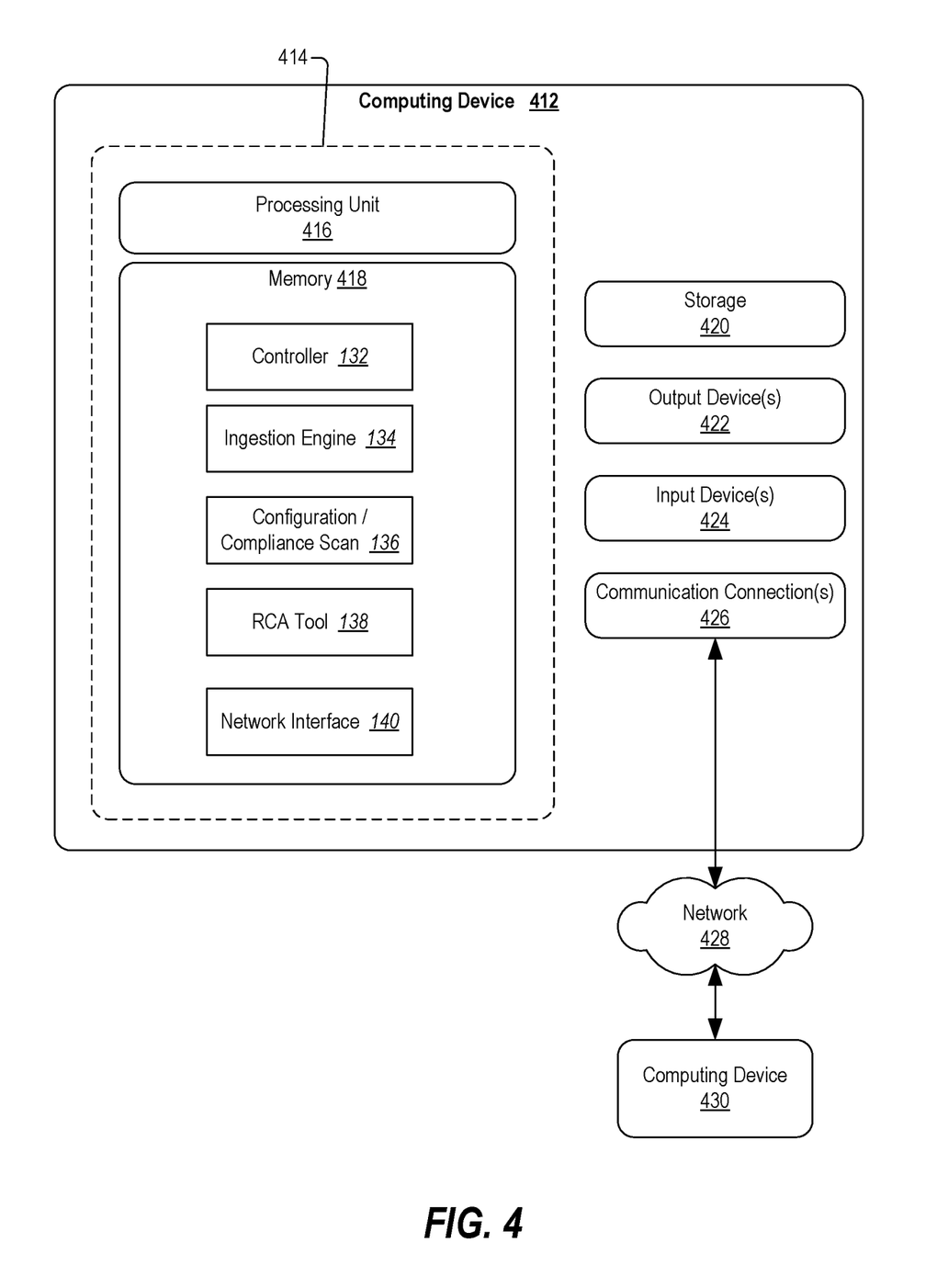
FIG. 4 illustrates a block diagram of an enterprise IHS having a computing device that performs aspects of the present disclosure, according to one or more embodiments.

FIG. 4 illustrates a system 400 including a computing device 412 configured to implement one or more embodiments provided herein. In one configuration, computing device 412 includes at least one processing unit 416 and memory 418. Depending on the exact configuration and type of computing device, memory 418 may be volatile, such as RAM, non-volatile, such as ROM, flash memory, etc., or a combination of the two. This configuration is illustrated in FIG. 4 by dashed line 414.

In other embodiments, device 412 includes additional features or functionality. For example, device 412 may include additional storage such as removable storage or non-removable storage, including, but not limited to, magnetic storage, optical storage, etc. Such additional storage is illustrated in FIG. 4 by storage 420. In one or more embodiments, computer readable instructions to implement one or more embodiments provided herein are in storage 420. Storage 420 may store other computer readable instructions to implement an operating system, an application program, etc. Computer readable instructions may be loaded in memory 418 for execution by processing unit 416, for example.

The term "computer readable media" as used herein includes computer storage media. Computer storage media includes volatile and nonvolatile, removable and non-removable media implemented in any method or technology for storage of information such as computer readable instructions or other data. Memory 418 and storage 420 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 412. Any such computer storage media is part of device 412.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 412 includes input device(s) 424 such as keyboard, mouse, pen, voice input device, touch input device, infrared cameras, video input devices, or any other input device. Output device(s) 422 such as one or more displays, speakers, printers, or any other output device may be included with device 412. Input device(s) 424 and output device(s) 422 may be connected to device 412 via a wired connection, wireless connection, or any combination thereof. In one or more embodiments, an input device or an output device from another computing device may be used as input device(s) 424 or output device(s) 422 for computing device 412. Device 412 may include communication connection(s) 426 to facilitate communications via a network 428 with one or more other computing devices 430. Certain functionalities of compliance drift detection and root cause analysis can be performed by software applications resident in memory 418, such as controller 132, ingestion engine 134, configuration/compliance scan engine 136, root cause analysis (RCA) tool 138, network interface 140.

Figure 5:
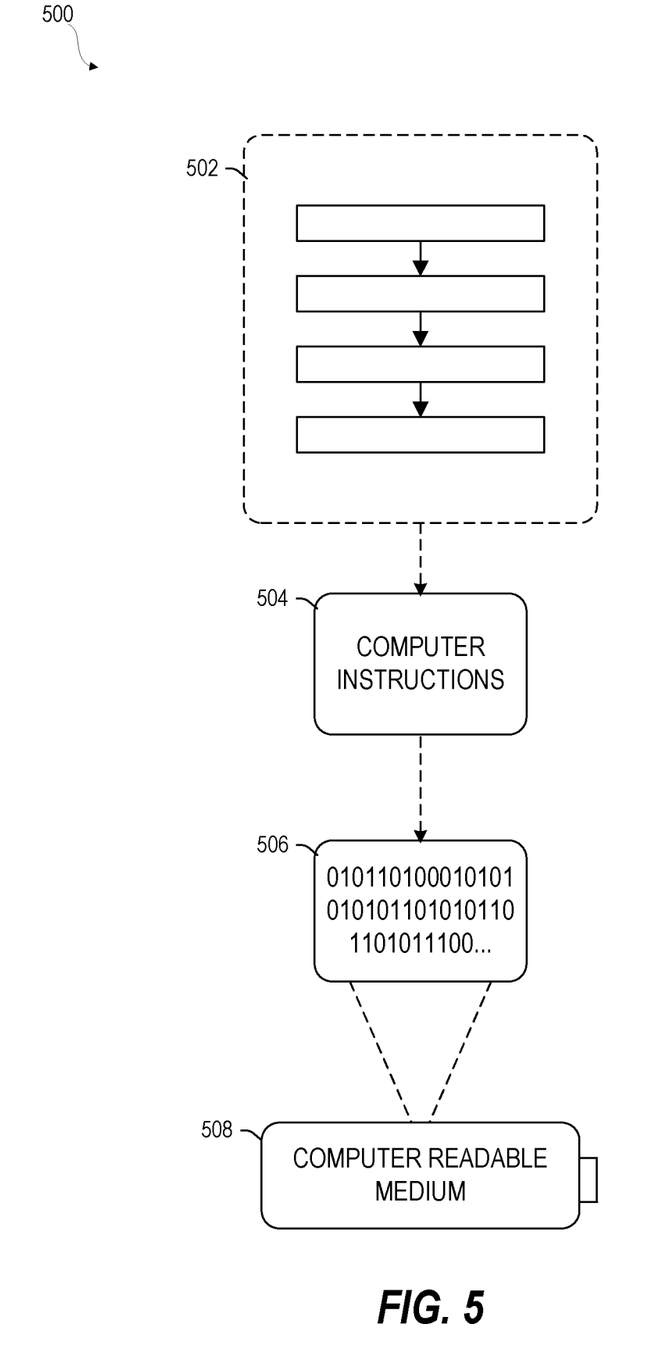
FIG. 5 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 504 may be configured to perform a method, such as method 200 of FIG. 2 or method 300 of FIG. 3. In another embodiment, the processor-executable instructions 504 may be configured to implement a system, such as CCDA system 130. Many such computer-readable media may be devised by those of ordinary skill in the art that are configured to operate in accordance with the techniques presented herein.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed.

Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method, comprising:
    detecting occurrence of a triggering event that has potential for degrading compliance of an enterprise information handling system, wherein detecting occurrence of the triggering event further comprises detecting deployment of at least one of a container or code to one or more nodes of the enterprise information handling system;
    performing a configuration scan of at least one of hardware or software of the enterprise information handling system to obtain current configuration information;
    determining one or more changes in the current configuration information based on a comparison of the current configuration information with baseline configuration information obtained in response to a previous triggering event;
    determining whether at least one change of the one or more changes in the current configuration information is non-compliant based on a comparison to compliance status information; and
    invoking two or more compliance remediation operations in response to determining that the at least one change is non-compliant, wherein the two or more compliance remediation operations include:
        performing root cause analysis on at least one source of data recorded during the trigger event to identify an entity and event that caused the non-compliant change in the configuration; and
        generating a notification to prompt correction of the entity to avoid a repeated occurrence of the non-compliant change.

2. The method of claim 1, wherein detecting occurrence of the triggering event further comprises: monitoring messaging of a change control module of the enterprise information handling system; and determining whether any messaging satisfies a criterion in a trigger event database for detecting occurrence of the triggering event.

3. The method of claim 1, wherein detecting occurrence of the triggering event further comprises detecting a change to a hardware configuration of the enterprise information handling system that changes availability of at least one of a server or storage appliance.

4. The method of claim 1, wherein performing the root cause analysis further comprises performing one or more of cross correlation analysis, pattern matching, or neural network analysis to identify the entity and the event that caused the non-compliant change in the configuration.

5. The method of claim 1, further comprising: determining the change to the configuration comprises deploying more than one identical change to respective servers of the enterprise information handling system; and performing the root cause analysis on the at least one source of data to identify an entity that caused the change in the configuration to a particular node of a cluster of the enterprise information handling system; associating the particular node to the other respective nodes of the cluster that received the identical change; and identifying an identical corrective action for each of the respective node to remediate the respective non-compliant change.

6. A system, comprising:
a processor coupled to a memory that stores instructions that, when executed by the processor, cause the processor to:
detect occurrence of a triggering event that has potential for degrading compliance of an enterprise information handling system, wherein the triggering event comprises deployment of at least one of a container or code to one or more nodes of the enterprise information handling system;
perform a configuration scan of at least one of hardware or software of the enterprise information handling system to obtain current configuration information;
determine one or more changes in the current configuration information based on a comparison of the current configuration information with baseline configuration information obtained in response to a previous triggering event;
determine whether any of the one or more changes identified in the current configuration information are non-compliant based on a comparison to compliance status information; and
invoke two or more compliance remediation operations in response to determining that at least one change is non-compliant, wherein the two or more compliance remediation operations include:
performing root cause analysis on at least one source of data recorded during the trigger event to identify an entity and event that caused the non-compliant change in the configuration; and
generating a notification to prompt correction of the entity to avoid a repeated occurrence of the non-compliant change.

7. The system of claim 6, wherein the instructions that cause the processor to detect occurrence of the triggering event further cause the processor to: monitor messaging of a change control module of the enterprise information handling system; and determine whether any messaging satisfies a criterion in a trigger event database for detecting the triggering event.

8. The system of claim 6, wherein the triggering event comprises a change in hardware configuration of the enterprise information handling system that changes availability of at least one of a server or storage appliance.

9. The system of claim 6, wherein another one of the one or more compliance remediation operations is a notification operation that prompts correction of the entity to avoid a repeated occurrence of the change that is non-compliant.

10. The system of claim 6, wherein the root cause analysis operation employs one or more cross correlation analysis, pattern matching, or trained neural network analysis to identify the entity and the event that caused the change that is non-compliant.

11. The system of claim 6, wherein the instructions further cause the processor to: determine whether the change to the configuration comprises deploying more than one identical container to respective servers of the enterprise information handling system; and perform the root cause analysis operation on the at least one source of data to identify an entity that caused the change in the configuration to a particular node of a cluster of the enterprise information handling system; associate the particular node to the other respective nodes of the cluster that received the identical container; and identify an identical corrective action for each of the respective node to remediate the respective change that is non-compliant.

12. The system of claim 6, wherein the information handling system comprises: more than one node that performs computation or data storage; a deployment component communicatively coupled to the more than one node that distributes a configuration change to select nodes of the more than one node; and a change management component communicatively coupled to the deployment component that controls timing of distribution of the configuration change by the deployment component.

13. A non-transitory computer-readable storage medium comprising computer-executable instructions, which when executed by a processor performs acts, comprising:
detecting occurrence of a triggering event that has potential for degrading compliance of an enterprise information handling system, wherein the triggering event corresponds to a change to a node of the information handling system;
performing a configuration scan of at least one of hardware or software of the enterprise information handling system to obtain current configuration information in near real time in response to the triggering event;
determining one or more changes in the current configuration information based on a comparison of the current configuration information with baseline configuration information obtained in response to a previous triggering event;
determining that at least one of the one or more changes in the current configuration information is non-compliant based on a comparison to compliance status information; and
invoking two or more compliance remediation operations in response to determining that the at least one change is non-compliant, wherein the two or more compliance remediation operations include:
performing root cause analysis on at least one source of data recorded during the trigger event to identify an entity and event that caused the non-compliant change in the configuration; and
generating a notification to prompt correction of the entity to avoid a repeated occurrence of the non-compliant change.

14. The non-transitory computer-readable storage medium of claim 13, further comprising invoking a machine-learning predictive model to identify the event and entity that caused the at least one change that is non-compliant.

15. The non-transitory computer-readable storage medium of claim 13, further comprising:
identifying deployment of an identical change on at least a second node in a cluster of nodes of the information handling system;
performing root cause analysis of the at least the second node to identify the entity that caused the change on the at least the second node; and
triggering an identical corrective action for each node to remediate the change that is non-compliant.

* * * * *